US008050173B2

(12) United States Patent
Garrett

(10) Patent No.: US 8,050,173 B2
(45) Date of Patent: Nov. 1, 2011

(54) DYNAMIC PRECISION FOR DATAPATH MODULES

(75) Inventor: David Garrett, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 253 days.

(21) Appl. No.: 12/216,241

(22) Filed: Jul. 1, 2008

(65) Prior Publication Data

US 2010/0002572 A1 Jan. 7, 2010

(51) Int. Cl.
*H04J 11/00* (2006.01)
(52) U.S. Cl. ................... 370/210; 370/208; 375/260
(58) Field of Classification Search .......... 370/200–253, 370/317–318, 364–365; 455/501–506, 63.1–66.1, 455/278.1–279.1, 67.13–67.7, 114.2–114.3, 455/222, 135–136; 375/260
See application file for complete search history.

(56) References Cited

U.S. PATENT DOCUMENTS

| | | | |
|---|---|---|---|
| 5,717,620 A | 2/1998 | Williams | |
| 6,405,147 B1* | 6/2002 | Fera | 702/112 |
| 7,098,821 B2* | 8/2006 | Husted et al. | 341/61 |
| 2002/0159533 A1* | 10/2002 | Crawford | 375/260 |
| 2002/0159733 A1* | 10/2002 | Flory et al. | 385/125 |
| 2004/0111227 A1 | 6/2004 | Stein et al. | |
| 2004/0203465 A1* | 10/2004 | Goldstein et al. | 455/67.13 |
| 2009/0268603 A1* | 10/2009 | Sampath et al. | 370/210 |

FOREIGN PATENT DOCUMENTS

| | | |
|---|---|---|
| WO | WO 2005/107118 A1 | 11/2005 |
| WO | WO 2007/047835 A2 | 4/2007 |

OTHER PUBLICATIONS

European Search Report for Application No. 09007913.8—1237 dated Dec. 4, 2009, seven (7) pages.
Examination Report for Application No. 09 007 913.8—1237 mailed Mar. 8, 2011, five (5) pages.

* cited by examiner

*Primary Examiner* — Pao Sinkantarakorn
*Assistant Examiner* — Iqbal Zaidi
(74) *Attorney, Agent, or Firm* — Sterne, Kessler, Goldstein & Fox P.L.L.C.

(57) ABSTRACT

A system and method for dynamically reducing the precision of datapath modules within an FFT unit without adversely affecting the demodulation of an orthogonal frequency division multiplexing (OFDM) signal. An FFT unit is typically implemented in an OFDM receiver to separate sub-carriers within a received OFDM signal. In general, an FFT unit implemented within an OFDM receiver must be designed to operate with a precision high enough such that quantization noise, introduced within the FFT unit, does not dominate the overall maximum SNR requirement of the system. However, the SNR requirement for many OFDM receivers is dynamic and, as a result, OFDM receivers often have an instantaneous SNR requirement far below the required maximum. In these situations, it would be advantageous to reduce the precision of datapath modules within the FFT to conserve power, which is often limited in wireless devices.

21 Claims, 9 Drawing Sheets

DYNAMIC PRECISION FOR DATAPATH MODULES

BACKGROUND

The invention pertains in general to a communications receiver with a dynamic signal-to-noise ratio (SNR) requirement and, more particularly, to a system and method for optimizing the precision of datapath modules within a communications receiver with a dynamic SNR requirement.

In a multi-carrier communications system a plurality of sub-carriers are transmitted over a single transmission path at the same time. Orthogonal frequency division multiplexing (OFDM) is one commonly implemented multi-carrier scheme in which the plurality of sub-carriers are orthogonal in frequency. The sub-carriers in an OFDM carrier signal typically overlap in frequency but do not interfere with each other. Each sub-carrier may be modulated using any one of a number of modulation schemes, including quadrature amplitude modulation (QAM) (e.g., 16 and 64-QAM) and quadrature phase-shift keying (QPSK).

An OFDM transceiver typically applies a fast Fourier transform (FFT) to separate sub-carriers of a received OFDM carrier signal. In a similar manner, an OFDM transceiver typically applies an inverse FFT (IFFT) to generate an OFDM carrier signal for transmission by combining a plurality of sub-carriers. The FFT, in general, defines a set of processes for reducing the time required to compute a discrete Fourier transform (DFT) and has several different implementations. However, each implementation of the FFT performs the DFT over a finite duration sequence of N sample points, x(n), that represent samples of a received OFDM carrier signal. The DFT may be defined as:

$$X(k) = \sum_{n=0}^{N-1} x(n) e^{-j\left(\frac{2\pi}{N}\right)nk}$$

$$k = 0, 1, \ldots N-1$$

The DFT is inherently a block process that is computed over a block of N samples; N being typically defined as the number of sub-carriers transmitted over the received OFDM carrier signal. The N samples, x(n), are multiplied successively by complex exponentials over the range of frequencies of the sub-carriers, and each product is summed. The output of the above equation, x(k), represents the value of the spectrum for the kth frequency, i.e., the value of the sub-carrier at the kth frequency. In this way, sub-carriers of a received signal may be separated using a DFT computation.

An OFDM receiver generally implements a dedicated FFT unit that performs the above calculations using data represented in a fixed-point format. Samples of a received signal, x(n), are represented in a fixed-point format along with results of the FFT unit. The precision of a fixed-point number is determined by the number of bits used in its representation. As a result, in any finite length fixed-point data representation, some quantization noise may be introduced into the system. In an OFDM receiver, it is important that the quantization noise, introduced within the FFT unit, does not dominate the overall signal-to-noise ratio (SNR) requirement of the receiver. Typical OFDM receivers implement an FFT unit with enough precision to handle the worst case SNR requirement.

Although an FFT unit must be designed to handle the worst case SNR requirement of an OFDM receiver, in many cases the instantaneous SNR requirement is substantially less. For example, an OFDM receiver may be required to handle a worst case SNR requirement of 30 dB and, as a result, fixed-point data sizes within the FFT unit must be large enough so that quantization noise does not prevent the receiver from achieving this worst case SNR requirement. However, since the SNR requirement of the OFDM receiver may be dynamic, at any given point in operation, the OFDM receiver may have an instantaneous SNR requirement below 30 dB. As a result, the FFT unit operates with excess precision in many instances. The datapath modules within the FFT unit consume excess power performing computations and operations on fixed-point data bits that are unnecessary. Since power consumption is often critical in OFDM receivers that may be dependent on batteries, any excess power consumed decreases the utility of these devices.

Therefore, what is needed is a system and method for dynamically adjusting the precision of datapath modules within an FFT unit without adversely affecting the reception and demodulation of an OFDM carrier signal.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 6:
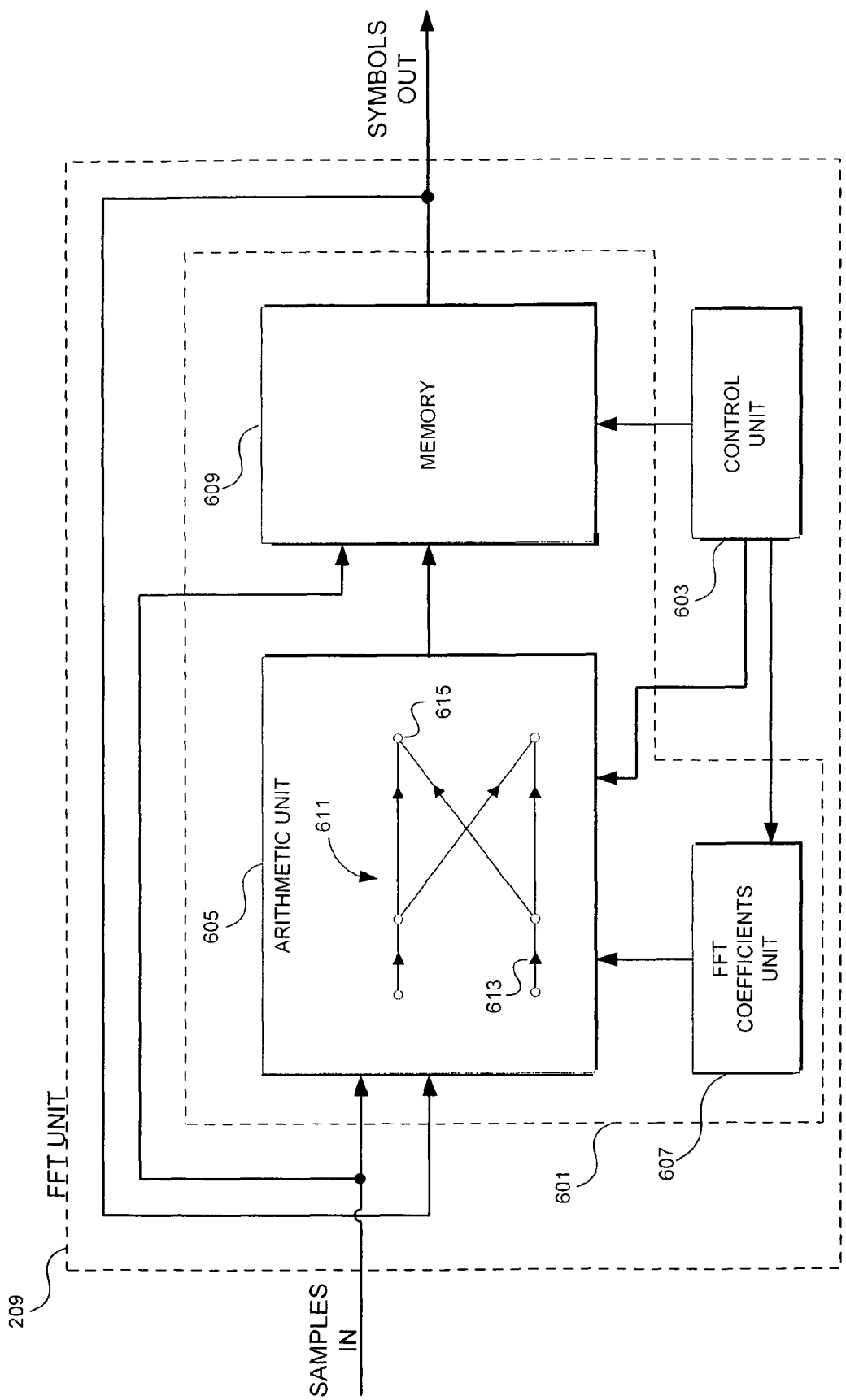
FIG. 6 illustrates an exemplary block diagram of an FFT unit, according to embodiments of the present invention.
Figure 11:
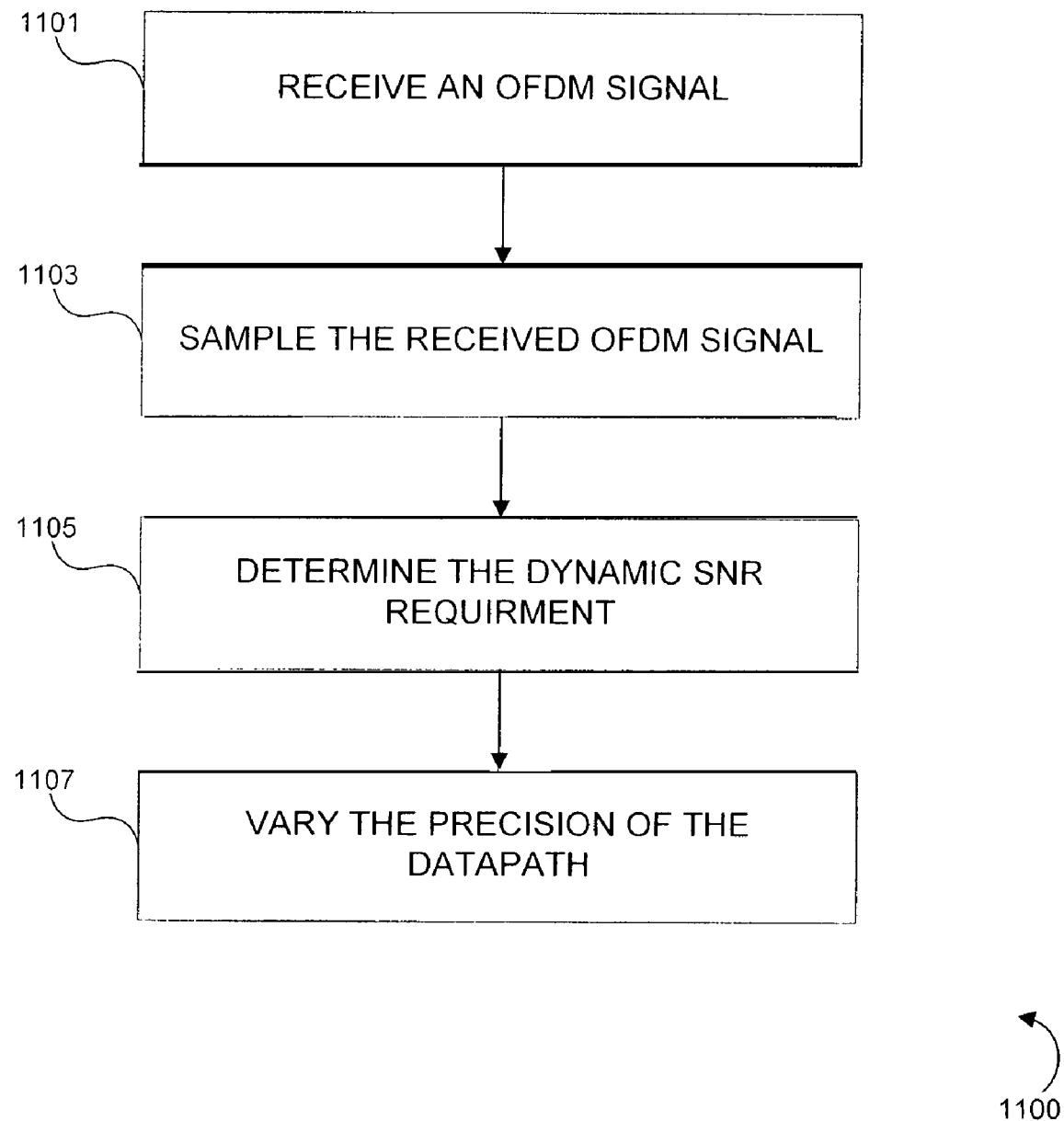
FIG. 11 illustrates a flowchart of exemplary steps for adjusting the precision of datapath modules within an FFT unit, such as the FFT unit of FIG. 6, based on a dynamic SNR requirement, according to embodiments of the present invention.
Figure 12:
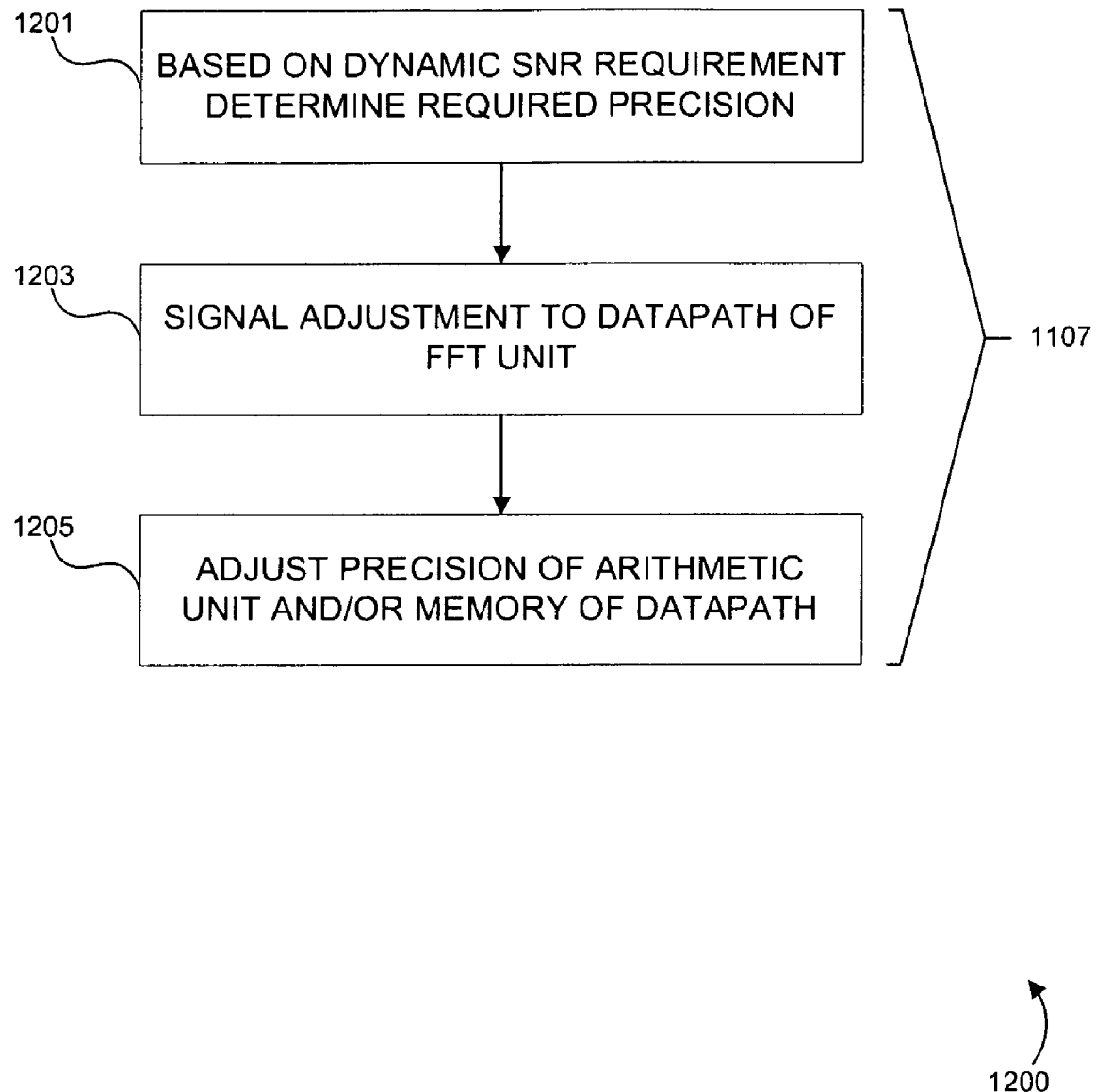

FIG. 12 further elaborates on the flowchart of FIG. 11 and illustrates a flowchart of exemplary steps for adjusting the precision of datapath modules within an FFT unit, such as the FFT unit of FIG. 6.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
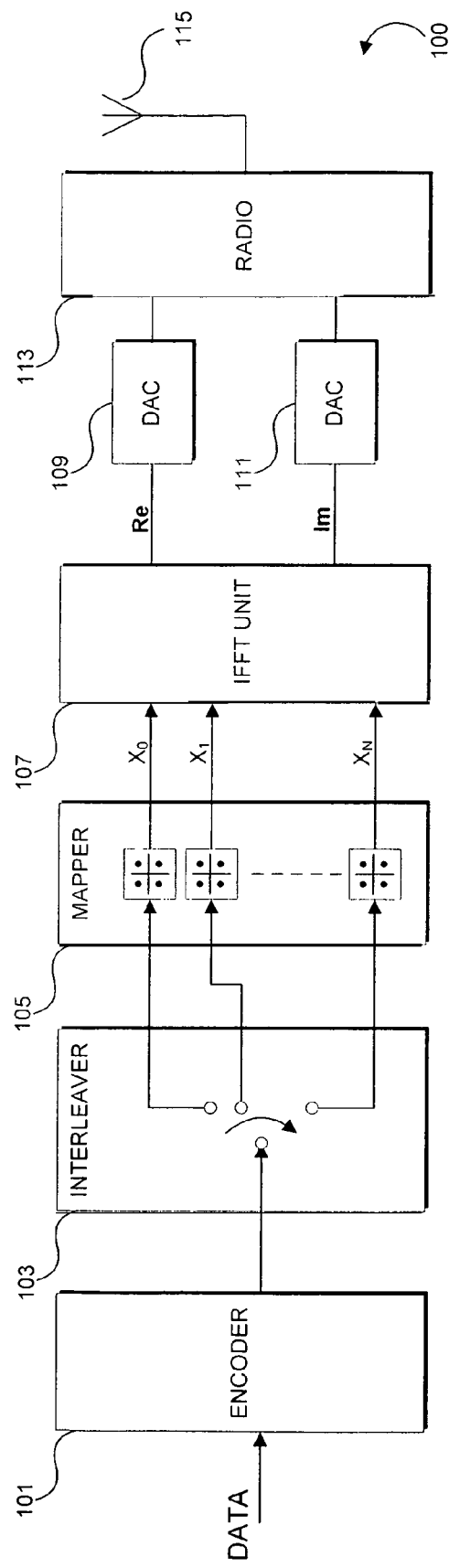
FIG. 1 illustrates an exemplary block diagram of OFDM transmitter implementation, according to embodiments of the present invention.

FIG. 1 provides a block diagram of an example wireless transmitter 100, according to an embodiment of the present invention. A wireless transmitter, such as wireless transmitter 100, receives an input data stream and manipulates the stream to properly format an output data stream for transmission. Wireless transmitter 100 implements orthogonal frequency division multiplexing (OFDM) to transmit a group of closely spaced sub-carriers over a channel. One skilled in the relevant art(s) will realize other multi-carrier modulation schemes may be used without departing from the scope of the invention. The input data stream may consist of voice, video, or any other application or program specific data. A wireless transmitter, such as wireless transmitter 100, will typically be located within a wireless device, such as a computer, a communications device, a personal digital assistant (PDA), or computer cards, such as PCI and PCMCIA based cards.

Wireless transmitter 100 includes encoder 101, interleaver 103, mapper 105, inverse fast Fourier transform (IFFT) unit 107, digital-to-analog converters (DACs) 109 and 111, radio 113, and radio frequency (RF) antenna 115. Encoder 101 receives an input data stream, destined for transmission, and adds redundant data to the stream. The redundant data is typically a complex function of a portion, or group, of the original data bits, and allows for forward error correction (FEC) to be performed at a receiving system. In general, FEC enables a receiving system to detect and correct for errors caused by corruption from the channel and receiver. The total amount of useful information sent, i.e. non-redundant data, is typically defined by the code rate, k/n; for every k bits of useful information, n bits of data are generated. Consequently, increasing the code rate invariably increases the data rate. However, a higher code rate imposes a higher SNR requirement at the receiver in order to reliable demodulate received signals.

Interleaver 103 can receive a serial stream of encoded data from encoder 101, and de-multiplex the serial data stream into a number of parallel data streams. Interleaving is often used in transmitters, such as wireless transmitter 100, to mitigate the effects of burst errors that may occur during transmission and reception of a signal by "spreading" errors out over the bit stream.

The parallel data streams generated by interleaver 103 are input into mapper 105. Mapper 105 maps each individual data stream to a series of complex symbols using any one of a number of digital modulation techniques, including quadrature amplitude modulation (QAM) and quadrature phase shift keying (QPSK). One or more bits of a data stream are mapped to a complex symbol that has a representative amplitude and phase governed by a predetermined constellation. The number of bits encoded per symbol dictates the number of symbols in the constellation. For instance, 64-QAM has 64 symbols and, as a result, each symbol modulated using 64-QAM can be mapped to 6 bits. Although increasing the order of the constellation (i.e., increasing the number of symbols per constellation) correspondingly leads to a higher data rate, the symbols of the constellation must be packed closer together and are therefore more susceptible to noise and other corruption (assuming the mean energy of the constellation remains constant). Modulation schemes with high-order constellations consequently have higher SNR requirements imposed at the receiver in order to reliably demodulate symbols that are more tightly packed in the complex domain. It is important to note that each parallel data stream received by mapper 103 may be mapped with a different order constellation and, in fact, a different modulation scheme all together.

Mapper 105 produces symbol streams $X_0$ through $X_N$, which are coupled to IFFT unit 107. IFFT unit 107 treats each symbol stream $X_0$ through $X_N$ as amplitudes for a range of sinusoids. The sinusoids are typically referred to as sub-carriers and, in OFDM systems, the sub-carriers are orthogonal in frequency. IFFT unit 107 performs arithmetic operations on the symbol streams, $X_0$ through $X_N$, to produce a time-domain OFDM signal with real and imaginary components (as illustrated in FIG. 1).

The real and imaginary components of the time-domain OFDM signal, produced by IFFT unit 107, are coupled to DACs 109 and 111, respectively, and their analog equivalents generated by DACs 109 and 111 are passed to radio 113. It should be noted that a single DAC may be used in place of DACs 109 and 111 in a non-direct conversion scheme. However, for exemplary purposes wireless transmitter 100 illustrates the use of two DACs 109 and 111. Radio 113 upconverts the received complex analog baseband signal, converting it to an RF signal for transmission. The RF signal represents an OFDM carrier signal, which is subsequently transmitted via RF antenna 115. In typical OFDM systems, a cyclic prefix is further added to the OFDM signal to prevent inter-symbol interference (ISI).

Figure 2:
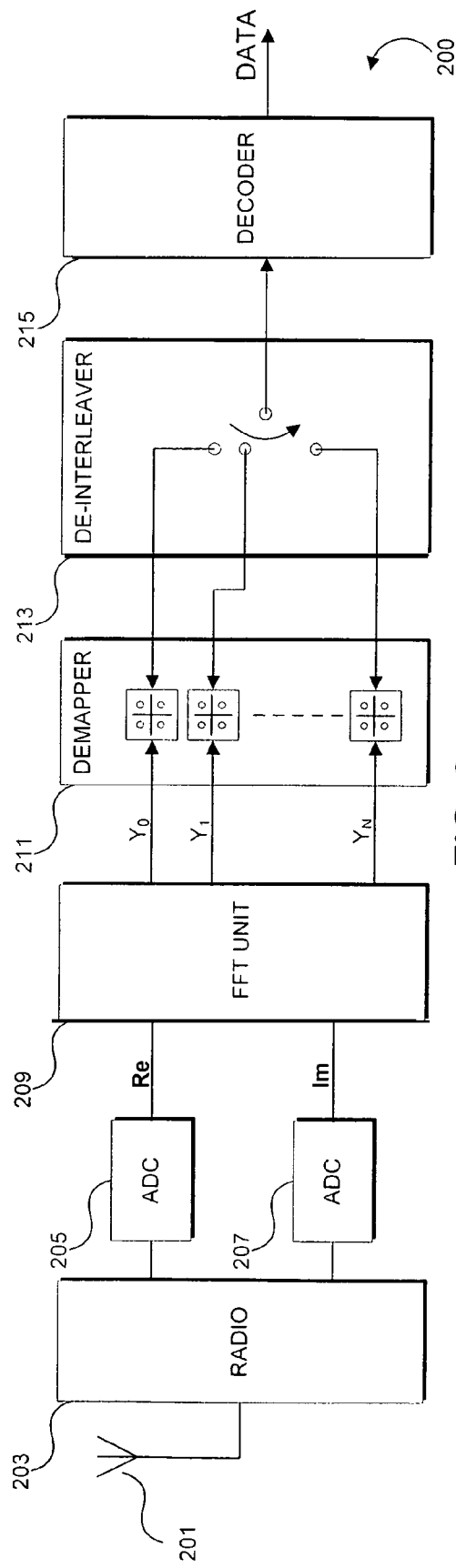
FIG. 2 illustrates an exemplary block diagram of an OFDM receiver implementation, according to embodiments of the present invention.

FIG. 2 illustrates a wireless receiver 200 that performs the inverse operation of wireless transmitter 100 to recover transmitted data. Wireless receiver 200 is an OFDM receiver that receives and demodulates an OFDM carrier signal. One skilled in the relevant art(s) will realize that receiver 200 may implement other multi-carrier modulation schemes without departing from the scope of the invention. The received OFDM carrier signal may carry voice, video, or any other application or program specific data. A wireless receiver, such as wireless receiver 200, will typically be located within a wireless device, such as a computer, a communications device, a personal digital assistant (PDA), or computer cards, such as PCI and PCMCIA based cards.

Wireless receiver 200 includes antenna 201, radio 203, analog-to-digital converters (ADCs) 205 and 207, fast Fourier transform (FFT) unit 209, de-mapper 211, de-interleaver 213, and decoder 215. The operation of wireless receiver 200 typically starts with the reception of an OFDM carrier signal by RF antenna 201. Radio 203 performs down conversion of the received OFDM carrier signal and outputs a baseband OFDM signal that has real and imaginary components. The real and imaginary components are converted from the analog domain via ADCs 205 and 207. Any cyclic prefix added to the received OFDM signal by the transmitter will be removed before being sent to FFT unit 209.

FFT unit 209 is coupled to ADCs 205 and 207 and receives digital samples of the received OFDM signal produced by ADCs 205 and 207. It should be noted that a single ADC may be used in place of ADCs 205 and 207 in a non-direct conversion scheme. However, for exemplary purposes wireless receiver 200 illustrates the use of two ADCs 205 and 207. The samples are typically represented in a fixed-point format with a minimum bit-width dictated by the properties of the received OFDM signal. FFT unit 209 performs the FFT over a block of N samples received from ADCs 205 and 207 to separate the sub-carriers from the OFDM signal. A stream of symbols $Y_0$ though $Y_N$ are subsequently produced by FFT unit 209. Each symbol stream $Y_0$ though $Y_N$ corresponds to a sub-carrier within the OFDM signal. The symbols $Y_0$ though $Y_N$ are coupled to de-mapper 211 that converts the complex symbols into the original bit(s) of the bit stream and de-interleaver 213 then (ideally) converts the parallel streams of bits back to the original serial stream of encoded data. Decoder 215 applies a FEC scheme to the encoded data stream to produce the original transmitted data.

Figure 3:
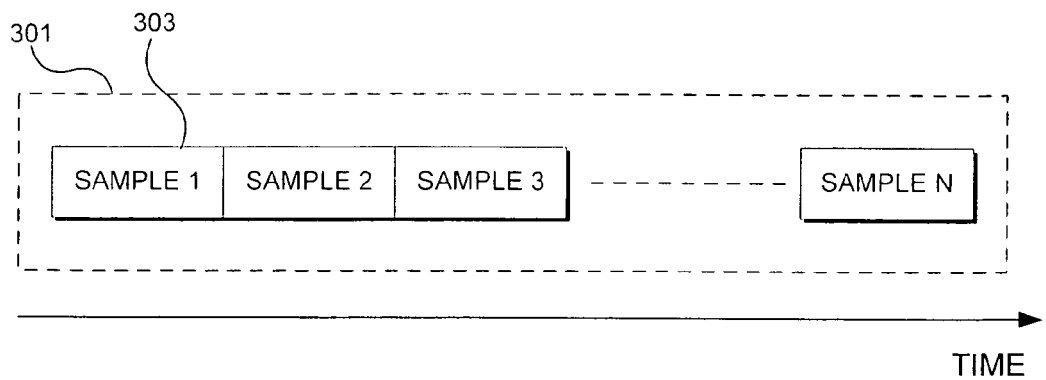
FIG. 3 illustrates an exemplary block diagram of a block of OFDM signal samples, according to embodiments of the present invention.

FIG. 3 illustrates an exemplary stream of samples provided to FFT unit 209 from ADCs 205 and 207. A block of N samples 301 are passed to FFT unit 209, which performs the FFT over the entire block. Each sample 303 is received sequentially by FFT unit 209 over time as illustrated in FIG. 3, starting with sample 1 and ending with sample N.

Figure 4:
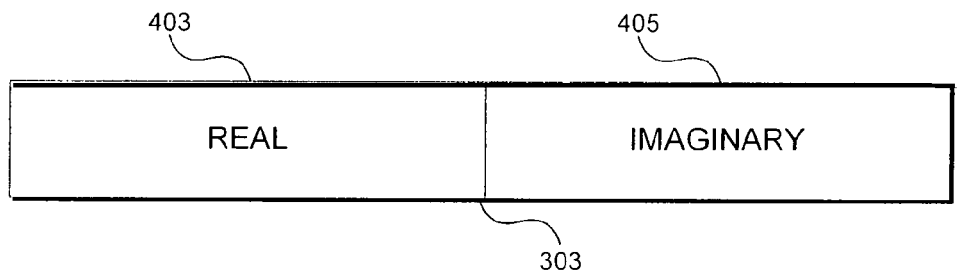
FIG. 4 illustrates a more detailed view of an exemplary block diagram of a single OFDM signal sample, according to embodiments of the present invention.

FIG. 4 illustrates exemplary data components that comprise each sample 303. As shown in FIG. 4, each sample contains both real and imaginary portions 403 and 405. The real portion 403 of sample 303 is typically referred to as the in-phase component (I) and the imaginary portion 405 is typically referred to as the quadrature component (Q).

Figure 5:
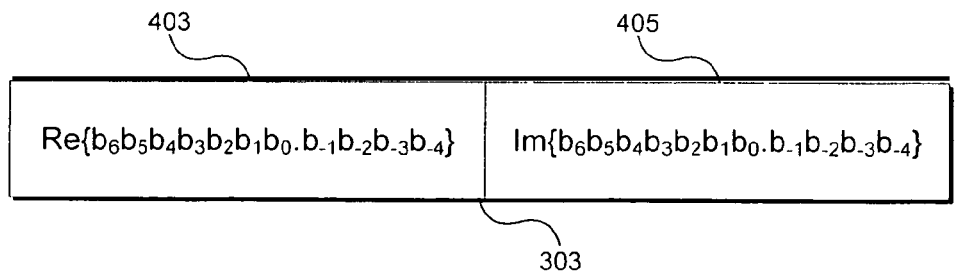
FIG. 5 illustrates an even further detailed view of an exemplary block diagram of a single OFDM signal sample, according to embodiments of the present invention.

FIG. 5 illustrates an even more detailed view of an exemplary sample 303 and its individual real and imaginary portions 403 and 405. In typical FFT units, such as FFT unit 209, a dedicated hardware unit is designed and operated to perform the FFT over a block of N samples. The FFT units operate on binary data that is usually represented in a fixed-point format. FIG. 5 illustrates both the real and imaginary components of sample 303 as being represented in a fixed-point format. Fixed-point numbers, in general, have a fixed number of bits after the radix point (i.e., the decimal point) and the precision of a fixed-point representation, as mentioned earlier, is directly related to the number of bits used in its representation. The real and imaginary portions 403 and 405 of exemplary sample 303 are shown in FIG. 5 with 11 bits of precision. Each portion of sample 303 has 7 bits of precision after the radix point and 4 bits of precision before the radix point. In general, a digital representation of a sample that uses a higher number of bits, i.e. that has a higher precision, will result in a better approximation of the signal. It should be noted that an additional bit may be further used in real and imaginary portions 403 and 405 as a sign bit in the representation of a fixed-point number that may be either positive or negative in value. The additional sign bit can be used to represent a number in sign-magnitude or two's complement form.

The process of approximation in digital signals is referred to as quantization. Quantization defines the difference between two consecutive binary values. The size of this difference is referred to as a quantization step and, in effect, the quantization step determines the effective noise floor for a system or unit that processes data using a particular level of quantization. For example, a data value represented with 8 bits of precision has a quantization step of $1/(2^8)$ or 1/256.

In many systems, such as FFT unit 209, it is important to process data with a certain precision, since the noise floor of a system determines the maximum SNR achievable. The SNR requirement of FFT unit 209 is, in general, dictated by several factors. One such factor includes the digital modulation scheme used in each sub-carrier of the received OFDM signal. As mentioned earlier, the higher the order constellation used in the digital modulation of a sub-carrier, the higher the required SNR imposed at the receiver in order to reliably demodulate the carrier-signal. Since each sub-carrier may modulate its respective data using a different modulation scheme, FFT unit 209 is required to handle the worst case (i.e., the largest) SNR requirement of any sub-carrier.

Another factor that contributes to the SNR requirement of FFT unit 209 is the code rate. As mentioned earlier, a higher code rate has less redundancy and is therefore more susceptible to corruption from the channel and receiver. Redundancy allows for a FEC scheme to be implemented at the receiver, which may be able to detect and, in some instances, correct errors in a received bit stream. In general, however, the number of errors that may be detected and corrected at a receiver is proportional to the amount of redundancy added to a transmitted bit stream. The SNR requirement of FFT unit 209 is consequently dependent on the code rate and the amount of redundancy provided in the transmitted data.

FIG. 6 illustrates an exemplary implementation of FFT unit 209. FFT unit 209 includes data path 601 and control unit 603. Control unit 603 is responsible for controlling the operation of datapath 601 to perform the FFT over a block of received samples, such as block of samples 301. In an embodiment, datapath 601 includes arithmetic unit 605 (also called logic unit 605), FFT coefficients unit 607, and memory 609. It should be understood that memory 609 may be implemented outside datapath 601 and, in general, outside FFT unit 209. In embodiments, memory 609 is a random access memory (RAM).

FFT unit 209 receives a block of samples, such as block of samples 301, and performs the FFT over the samples to produce an output stream of symbols for each respective sub-carrier. The received samples may be stored in memory 609 or directly input into arithmetic unit 605 for processing. FFT units, such as FFT unit 209, may pipeline or time-multiplex the use of arithmetic unit 605 in order to conserve space and cost in a dedicated hardware implementation. Since arithmetic unit 605 may be pipelined or multiplexed over time, intermediate results produced by arithmetic unit 605 may further be stored within memory 609 or, alternatively, within dedicated registers not shown within FIG. 6. Alternatively, arithmetic unit 605 may implement a full array of butterfly units, necessary for the FFT computation, without time multiplexing or pipeline. In this instance, the need for memory 609 may be obviated. It will be readily apparent to one skilled in the relevant art(s) that various implementations of FFT unit 209 may be realized without departing from the scope of the present invention.

Arithmetic unit 605 typically implements a series of butterfly operations 611 that require multipliers 613 and adders 615. Butterfly operations, such as butterfly operation 611, illustrate the basic computations performed by many FFT processes. Butterfly operation 611 is illustrated as a radix-2 butterfly operation in FIG. 6. It will be understood by one skilled in the relevant art(s) that other implementations of butterfly operation 611 may be used without departing from the scope of the present invention. In embodiments, multipliers 613 and adders 615 may perform complex multiplication or complex addition, respectively.

Arithmetic unit 605 operates on received samples of an OFDM signal or intermediate results, each of which may be stored in memory 609 or intermediate registers not shown within FIG. 6. In addition, arithmetic unit 605 further operates on a series of coefficients provided by FFT coefficients unit 607. The coefficients provided by FFT coefficients unit 607 are typically provided to multipliers 613 and each coefficient may be a complex number.

As mentioned earlier, FFT unit 209 performs the FFT over a block of received samples that are represented in a fixed point format with a certain precision. Intermediate results and FFT coefficients, such as those provided by FFT coefficients unit 607, may similarly be represented in a fixed-point format with a certain precision. Depending on the modulation schemes of the received sub-carriers and, more specifically, depending on the highest order constellation of the sub-carriers within the received OFDM signal, datapath 601 of FFT unit 209 may be operating with excess precision. In addition, depending on the code rate of the received sub-carriers, datapath 601 of FFT unit 209 may similarly be operating with excess precision.

FFT unit 209, in general, must be designed to operate with a precision high enough such that quantization noise, introduced within FFT unit 209, does not dominate the overall maximum SNR requirement of the system. However, the SNR requirement for many OFDM receivers is dynamic and, as a result, OFDM receivers often have an instantaneous SNR requirement far below the required maximum. In these situations, it would be advantageous to reduce the precision of datapath modules within FFT unit 209, such as arithmetic unit 605 and memory 609, to conserve power, which is often limited in wireless devices.

Several factors contribute to the instantaneous SNR requirement of an OFDM receiver, such as receiver 200, including the code rate in which received data was transmitted, as well as the modulation scheme used for each sub-carrier of an OFDM signal. The code rate and modulation scheme(s) may change based on any number of factors, including channel conditions. In general, a higher code rate imposes a higher SNR requirement at an OFDM receiver. Similarly, higher order constellations used in the modulation of sub-carriers impose a higher SNR requirement at an OFDM receiver.

In embodiments, the precision of datapath 601 within FFT unit 209 may be varied based on the modulation scheme(s) of sub-carriers within an OFDM signal. In another embodiment, the precision of datapath 601 within FFT unit 209 may be varied based on the code rate used to encode a received OFDM signal. In yet another embodiment, both the modulation scheme(s) and the code rate of an OFDM signal are used to vary the precision of datapath 601 within FFT unit 209.

Figure 7:
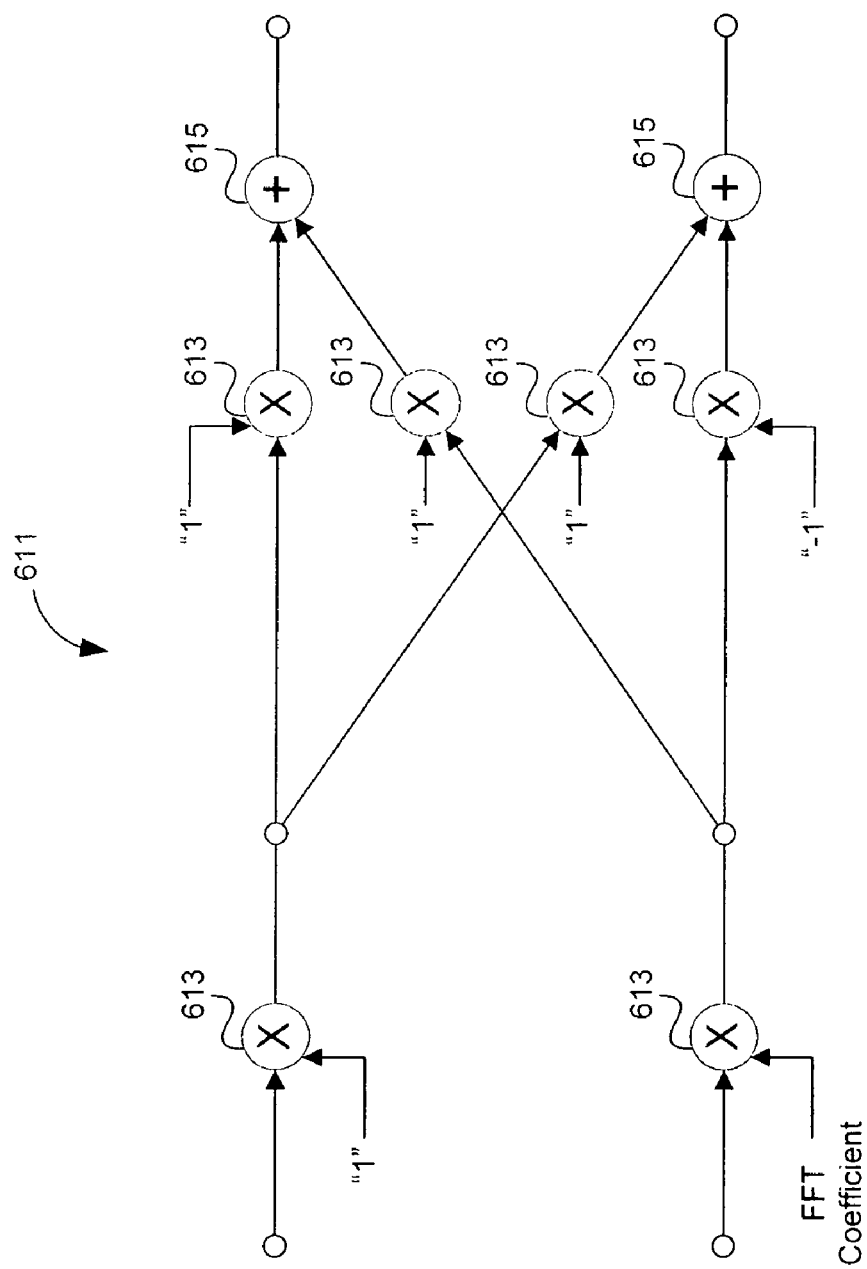
FIG. 7 illustrates an exemplary butterfly operation, according to embodiments of the present invention.

FIG. 7 illustrates an alternative view of exemplary butterfly operation 611 as shown in FIG. 6. Butterfly operation 611 of FIG. 6 was illustrated using a signal-flow diagram. Butterfly operation 611 of FIG. 7 presents an alternative view, which clearly illustrates multipliers 613 and adders 615. Butterfly operation 611 is again shown as a radix-2 butterfly operation. However, it will be understood by one skilled in the relevant art(s) that other implementations of butterfly operation 611 may be used without departing from the scope of the present invention, including, for example, radix-4 butterfly operations.

Referring back to FIG. 6, control unit 603 within FFT unit 209 may be further operable to vary the precision of datapath modules within datapath 601 based on the dynamic SNR requirement. For instance, memory 609 may be configured to read and write received samples of an OFDM signal with variable precision. Least significant bits of a sample can be dropped simply by failing to write or, alternatively, read the bits from memory 609. In an embodiment, bit line accesses of memory 609 are reduced as a result, which may decrease the overall power consumption by memory 609. Bit lines typically require pre-charging in certain RAM types, such as static RAM (SRAM) types. In addition, bit lines typically have a high associated capacitance and, as a result, unnecessary charging/discharging of bit lines significantly increases power consumption in memories. Control unit 603 can determine when the dynamic SNR requirement of OFDM receiver 200 changes and update the number of bits written and/or read from memory 609 accordingly.

In a similar manner, intermediate results of an FFT computation produced by arithmetic unit 605, maybe be written and read from memory 609. Control unit 603 may be operable to reduce the number of bits, beginning with the least significant bits, of the intermediate results written to and read from memory 609 in order to further reduce excess power consumption.

Figure 8:
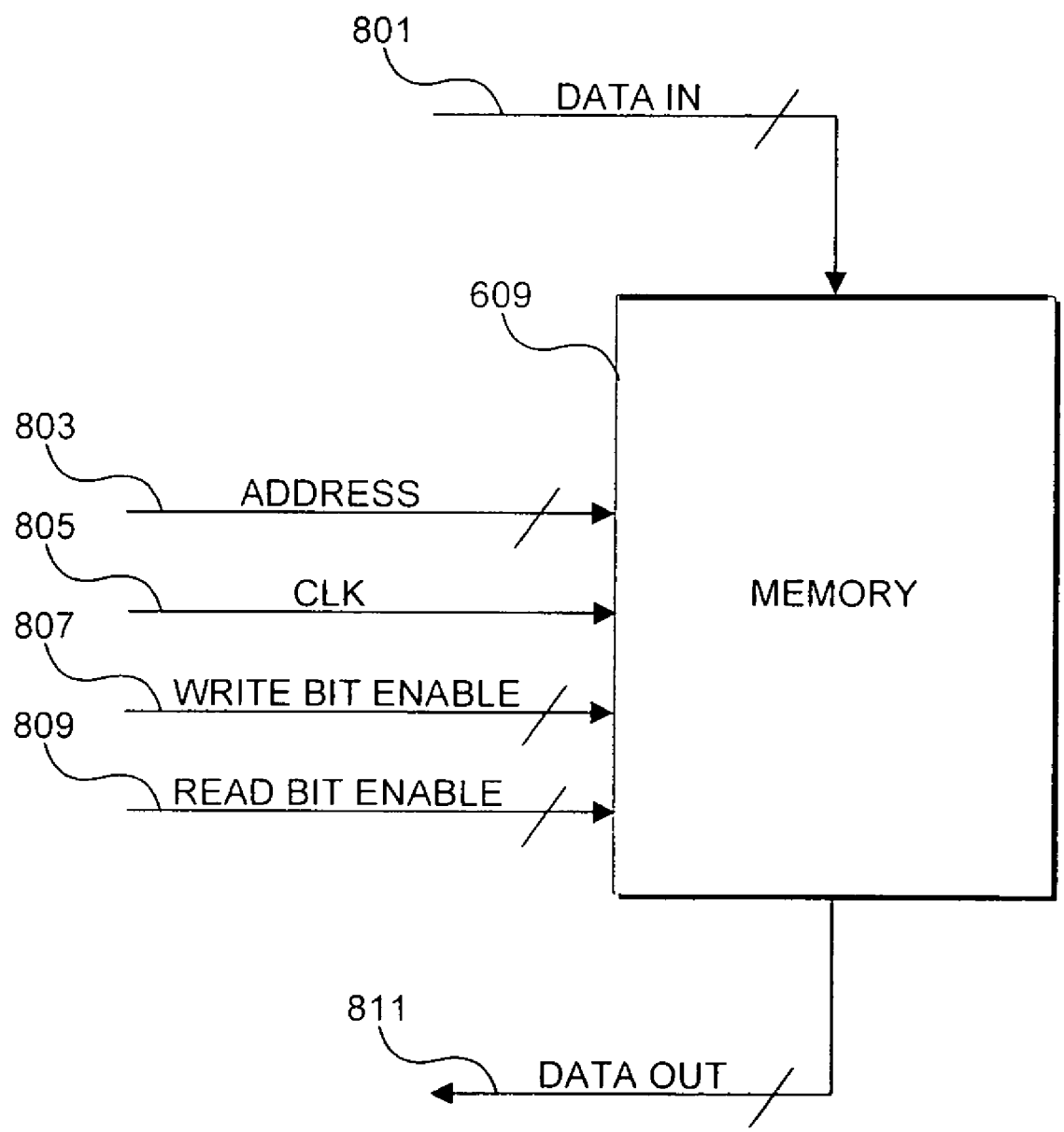
FIG. 8 illustrates an exemplary block diagram of a memory with the capability to dynamically adjust its precision, according to embodiments of the present invention.

FIG. 8 provides an exemplary implementation of memory 609 that may be capable of varying the precision of data read from and written to memory 609. Memory 609 includes the following inputs: data in 801, address 803, clk 805, write bit enable 807, and read bit enable 809. Memory 609 further includes a single output, data out 811. Address input 803 allows for a particular word to be accessed within memory 609, either for writing or reading. Input signal clk 805 provides a clock signal that may be used in synchronous memories, such as exemplary memory 609 of FIG. 8. Data to be written to memory 609 is placed on input lines, data in 801, such that data may be stored within memory 609. Alternatively, data to be read from memory 609 is accessed via output lines, data out 811.

In order to provide variable precision to data read from and written to memory 609, via data out 811 and data in 801, read and write bit enable inputs 807 and 809 are provided. Write bit enable 807 may allow a variable portion of a word (i.e., a variable number of bits) within memory 609 to be written to, thereby reducing power consumption. In a similar manner, read bit enable 809 may allow a variable portion of a word (i.e., a variable number of bits) within memory 609 to be read, thereby reducing power consumption. It will be understood by one skilled in the relevant art(s) that other exemplary implementations of memory 609 may be used without departing from the scope of the present invention.

In another embodiment, power consumption may be reduced in arithmetic unit 605 in a similar manner as memory 609. Control unit 603 determines the dynamic SNR requirement of OFDM receiver 200 and updates the number of bits required to represent data values that arithmetic unit 605 operates on. In particular, the excess power consumption by multipliers 613 and adders 615 may be reduced by "zeroing" out least significant bits of operands that provide unnecessary precision. In general, arithmetic unit 605 may implement several multipliers and adders. Consequently, reducing the power consumed by each individual multiplier or adder may significantly reduce the overall power consumption by arithmetic unit 605.

In an embodiment, arithmetic unit 605 is implemented in hardware using complimentary metal oxide semiconductor (CMOS) logic. In CMOS logic implementations, static power dissipation is nearly zero. Most power in CMOS designs is consumed dynamically, when nodes within the logic are changing (i.e., being charged and discharged). Consequently, by "zeroing" input bits of data values to be multiplied by multipliers 613, many nodes within the multiplier logic remain static (i.e. do not change) and dynamic power consumption is reduced. Similarly, by "zeroing" input bits of data values to be added by adders 615, many nodes within the adder logic remain static (i.e. do not change) and dynamic power consumption is reduced. It will be understood that other implementations, other than CMOS, may be used without departing from the scope of the present invention.

Figure 9:
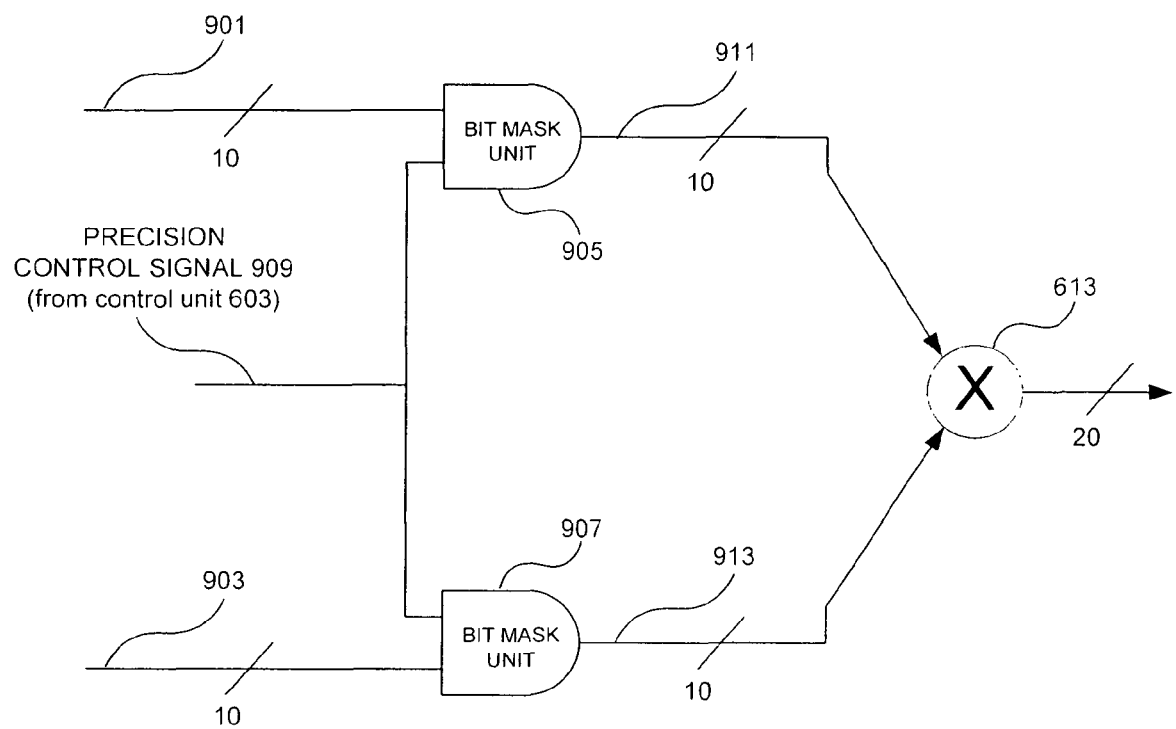
FIG. 9 illustrates an exemplary block diagram of a multiplier with the capability to dynamically adjust its precision, according to embodiments of the present invention.

FIG. 9 provides a block diagram of an embodiment used to "zero" out bits of data values to be multiplied by multiplier 613. FIG. 9 illustrates two exemplary 10-bit data values, 901 and 903, that are to be multiplied by multiplier 613. In embodiments, data value 901 is a sample data value and data value 903 is an FFT coefficient data value. The bits of data values 901 and 903 are input into bit mask units 905 and 907, respectively. Bit mask units 905 and 907 may be dedicated hardware units controlled by a precision control signal 909. In an embodiment, precision control signal 909 comes from control unit 603 of FFT unit 209 and may have a bus width equal to data values 901 and 903 (i.e., 10-bits). Each bit line of precision control signal 909 may correspond to and control a single bit value of data values 901 and 903. Precision control signal 909 controls bit mask units 905 and 907 to "zero" any number of bits used to represent each data value, depending on the required quantization precision of FFT unit 209. Bits of data values 901 and 903 are "zeroed" starting with the least significant bits. The output data values 911 and 913 of bit mask units 905 and 907 may still have the same number of bits as input data values 901 and 903. However, output data values 911 and 913 may represent reduced precision values of input data values 901 and 903, respectively. Output data values 911 and 913 are subsequently multiplied by multiplier 613.

Figure 10:
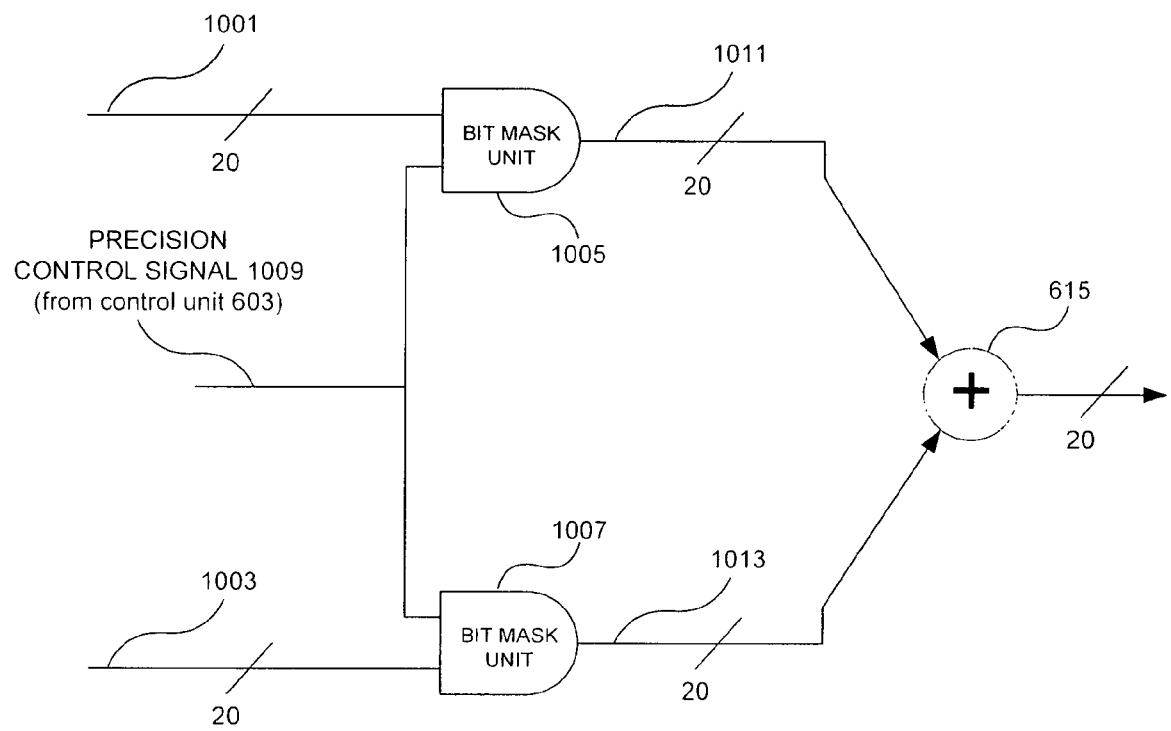
FIG. 10 illustrates an exemplary block diagram of an adder with the capability to dynamically adjust its precision, according to embodiments of the present invention.

FIG. 10 provides a block diagram of an embodiment used to "zero" out bits of data values to be added by adder 615. FIG. 10 illustrates two exemplary 10-bit data values, 1001 and 1003, that are to be added by adder 615. In embodiments, data value 1001 is a sample data value and data value 1003 is an FFT coefficient data value. The bits of data values 1001 and 1003 are input into bit mask units 1005 and 1007, respectively. Bit mask units 1005 and 1007 may be dedicated hardware units controlled by a precision control signal 1009. Precision control signal, in an embodiment, comes from control unit 603 of FFT unit 209 and may have a bus width equal to data values 901 and 1003 (i.e., 10-bits). Each bit line of precision control signal 1009 may correspond to and control a single bit value of data values 1001 and 1003. Precision control signal 1009 controls bit mask units 1005 and 1007 to "zero" any number of bits used to represent each data value, depending on the required quantization precision of FFT unit 209. Bits of data values 1001 and 1003 are "zeroed" starting with the least significant bits. The output data values 1011 and 1013 of bit mask units 1005 and 1007 may still have the same number of bits as input data values 1001 and 1003. However, output data values 1009 and 1011 may represent reduced precision values of input data values 1001 and 1003, respectively. Output data values 1011 and 1013 are subsequently added by adder 613.

Referring now to FIG. 11. FIG. 11 illustrates a flow chart for varying the precision of datapath modules within FFT unit 209 based on the dynamic SNR requirement of OFDM receiver 200. Flow chart 1100 begins at step 1101 with the reception of an OFDM carrier signal. After the reception of an OFDM signal in step 1101, flow chart 1100 proceeds to step 1103. At step 1103 the received OFDM signal is sampled. At step 1105, a dynamic SNR requirement is determined for reliably demodulating the data within the samples of the received OFDM signal. Based on the determined dynamic SNR requirement of the OFDM receiver, at step 1107 the precision of datapath 601 within FFT unit 209 is varied accordingly, thereby reducing power consumption. It will be understood by one skilled in the relevant art(s) that steps 1103 and 1105 may be performed on a "running basis", and that the determination of a dynamic SNR requirement may be based on past OFDM symbols received, as well as current OFDM symbols received. It should be further noted that the order presented by flow chart 1100 is not limiting. For example, steps 1103 and 1105, in general, may be performed in parallel with steps 1101 and 1107.

Referring now to FIG. 12. FIG. 12 illustrates a flow chart 1200 that elaborates on step 1107 of method 1100 illustrated in FIG. 11. Specifically, flow chart 1200 details an exemplary method for varying the precision of datapath 601 of FFT unit 209. Flow chart 1200 begins at step 1201. At step 1201 a determination is made regarding a required precision for datapath 601 such that a received OFDM signal may be properly demodulated. The determination is based on the dynamic SNR requirement of the OFDM receiver. Once a required precision is determined for reliably demodulating a given received OFDM signal, an adjustment signal is sent to datapath 601 at step 1203. At step 1205 the precision of arithmetic unit 605 and/or memory 609 of datapath 601 is adjusted accordingly based on the adjustment signal.

The present invention has been described with reference to an OFDM receiver and the FFT unit typically included within an OFDM receiver. Upon review of the teachings herein, individuals skilled in the relevant arts will recognize how to extend the present invention to other types of systems. For example, the present invention may be applied to the IFFT unit within an OFDM transmitter. The precision within an IFFT unit may be similarly adjusted to meet a requirement such that power consumption may be reduced. Such alternatives fall within the scope and spirit of the invention.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A fast Fourier transform (FFT) apparatus for use in an orthogonal frequency division multiplexing (OFDM) receiver that has a dynamic signal-to-noise ratio (SNR) requirement, the OFDM receiver for receiving an OFDM signal comprising a plurality of sub-carriers, the FFT apparatus comprising:

a datapath configured to compute an FFT over a block of data samples that are obtained from the received OFDM signal; and a control unit configured to adjust a precision with which the datapath computes the FFT over the block of data samples based on the dynamic SNR requirement of the OFDM receiver, wherein the control unit is configured to adjust the precision by directing the datapath to ignore least significant bits of data the datapath operates on, wherein the dynamic SNR requirement of the OFDM receiver is determined based on a number of bits transmitted per symbol over at least one of the plurality of sub-carriers in the received OFDM signal.

2. The FFT apparatus of claim 1, wherein a modulation type of the at least one of the plurality of sub-carriers is a quadrature amplitude modulation (QAM) type.

3. The FFT apparatus of claim 1, wherein a modulation type of the at least one of the plurality of sub-carriers is a phase-shift keying (PSK) modulation type.

4. The FFT apparatus of claim 1, wherein the dynamic SNR requirement of the OFDM receiver is determined based on a code rate used to encode the OFDM signal.

5. The FFT apparatus of claim 1, wherein the datapath comprises:
an arithmetic unit; and
a memory unit.

6. The FFT apparatus of claim 5, wherein the control unit is configured to adjust the precision by directing the memory unit or the arithmetic unit to ignore least significant bits of data the memory unit or the arithmetic unit operates on.

7. The FFT apparatus of claim 5, wherein the control unit is configured to control the memory unit to ignore least significant bits of data the memory unit operates on by not writing the least significant bits to the memory unit or reading the least significant bits from the memory unit.

8. The FFT apparatus of claim 5, wherein the arithmetic unit comprises a multiplier.

9. The FFT apparatus of claim 8, wherein the control unit is configured to adjust the precision by directing the multiplier to ignore least significant bits of data the multiplier operates on.

10. The FFT apparatus of claim 8, wherein the control unit is configured to adjust the precision by directing the multiplier to ignore the least significant bits of the data the multiplier operates on by forcing the least significant bits to zero.

11. The FFT apparatus of claim 5, wherein the memory unit is a random access memory (RAM).

12. A method for reducing power consumption in a fast Fourier transform (FFT) apparatus, the FFT apparatus for use in an orthogonal frequency division multiplexing (OFDM) receiver that has a dynamic signal-to-noise ratio (SNR) requirement, the method comprising:
receiving an OFDM signal;
sampling the received OFDM signal to obtain samples;
computing the FFT over the samples using the FFT apparatus; and
adjusting a precision with which the FFT is computed over the samples based on the dynamic SNR requirement of the OFDM receiver,
wherein the precision is adjusted by directing the FFT apparatus to ignore least significant bits of data the FFT apparatus operates on,
wherein the dynamic SNR requirement of the OFDM receiver is determined based on a number of bits transmitted per symbol over at least one sub-carrier in the received OFDM signal.

13. The method of claim 12, wherein a modulation type of the at least one sub-carrier is a quadrature amplitude modulation (QAM) type.

14. The method of claim 12, wherein a modulation type of the at least one sub-carrier is a quadrature phase-shift keying (QPSK) modulation type.

15. The method of claim 12, wherein the dynamic SNR requirement of the OFDM receiver is determined based on a code rate used to encode the OFDM signal.

16. An orthogonal frequency division multiplexing (OFDM) receiver that has a dynamic signal-to-noise ratio (SNR) requirement, the OFDM receiver for receiving an OFDM signal comprising a plurality of sub-carriers, the OFDM receiver comprising:
a fast Fourier transform (FFT) apparatus;
a demapper coupled to the FFT apparatus; and
a decoder coupled to the demapper;
wherein the FFT apparatus comprises:
a datapath configured to compute an FFT over a block of data samples that are obtained from the received OFDM signal; and
a control unit configured to adjust a precision with which the datapath computes the FFT over the block of data samples based on the dynamic SNR requirement of the OFDM receiver,
wherein the control unit is configured to adjust the precision by directing the datapath to ignore least significant bits of data the datapath operates on,
wherein the dynamic SNR requirement of the OFDM receiver is determined based on a number of bits transmitted per symbol over at least one of the plurality of sub-carriers in the received OFDM signal.

17. The OFDM receiver of claim 16, wherein a modulation type of the at least one of the plurality of sub-carriers is a quadrature amplitude modulation (QAM) type.

18. The OFDM receiver of claim 16, wherein a modulation type of the at least one of the plurality of sub-carriers is a phase-shift keying (PSK) modulation type.

19. The OFDM receiver of claim 16, wherein the dynamic SNR requirement of the OFDM receiver is determined based on a code rate used to encode the OFDM signal.

20. An inverse fast Fourier transform (IFFT) apparatus for use in an orthogonal frequency division multiplexing (OFDM) transmitter that has a dynamic signal-to-noise ratio (SNR) requirement, the OFDM transmitter for transmitting an OFDM signal comprising a plurality of symbol streams, the IFFT apparatus comprising:
a datapath configured to compute an IFFT over the plurality of symbol streams to generate the OFDM signal; and
a control unit configured to adjust a precision with which the datapath computes the IFFT over the plurality of symbol streams based on the dynamic SNR requirement of the OFDM transmitter,
wherein the control unit is configured to adjust the precision by directing the datapath to ignore least significant bits of data the datapath operates on,
wherein the dynamic SNR requirement of the OFDM transmitter is determined based on a number of bits per symbol in at least one of the plurality of symbol streams.

21. The IFFT apparatus of claim 20, wherein the dynamic SNR requirement of the OFDM transmitter is determined based on a code rate used to encode the OFDM signal.

* * * * *